UNITED STATES PATENT OFFICE.

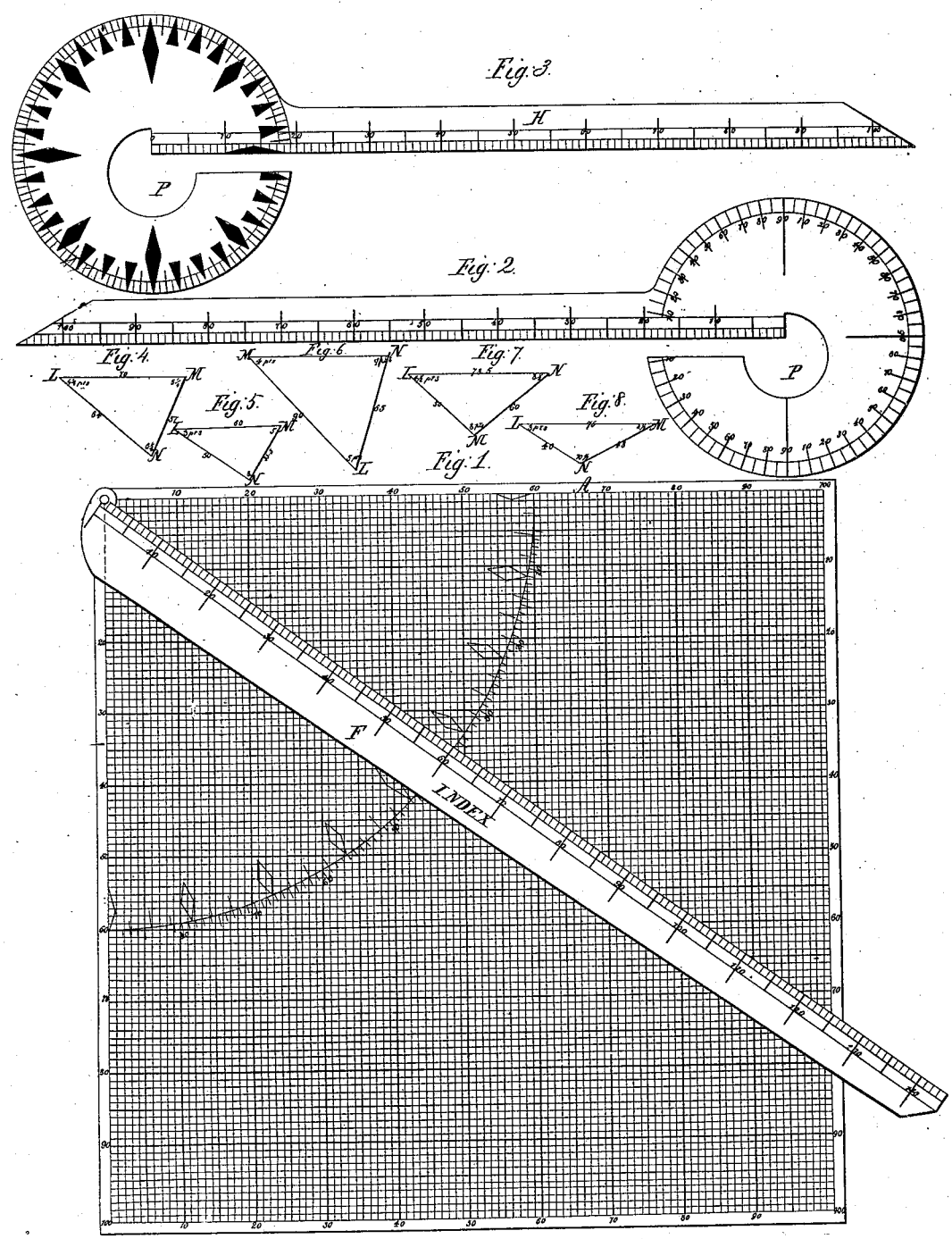

ALEXANDER M. CHISHOLM, OF ANTIGONISH, NOVA SCOTIA.

IMPROVEMENT IN SINICAL QUADRANTS.

Specification forming part of Letters Patent No. 29,767, dated August 28, 1860.

*To all whom it may concern:*

Be it known that I, ALEXANDER M. CHISHOLM, of Antigonish, in the county of Sydney and Province of Nova Scotia, have invented a new and useful instrument by which may be solved all useful problems in plane trigonometry and in navigation in all that relates to the keeping of the log, which instrument I denominate "Chisholm's Mathematical Mechanical Scale;" and I do hereby declare that the following is a full, clear, and exact description of the same, reference being had to the accompanying drawing, which represents the instrument and forms part of this specification.

The principal object of my invention is to obviate the necessity of calculation for keeping a correct reckoning by the log, the coaster or seaman having no knowledge whatever of sines and tangents being enabled by its aid to preserve as accurate a knowledge of his relative position as can be obtained by a log. It will give a correct reckoning at sea, either by middle latitude or Mercator sailing; give the difference of latitude and departure for every point and quarter-point of the quadrant, and for every degree; turn departure into longitude, either by middle latitude or Mercator sailing; give the meridional length of a degree from the equator to the poles, and give the sines and their complements, tangents, and secants for every degree in the quadrant without its being necessary for the operator to know that these were ever used for calculation. It will also serve to solve all useful problems in right-angled and oblique plane trigonometry, and to perform various arithmetical calculations.

The construction of the instrument is based upon the principle that the power of the hypotenuse is equal to that of both the base and the perpendicular.

The scale is a plane square of ten inches or other extent divided and subdivided into less squares of tenths each way, answering the purpose of enumeration, numbered at the angle of each division upon the sides, respectively, marked A B C D. There is a quadrant in one of the four angles marked E, the radius of which extends to sixty (60) of the subdivisions, or six-tenths of the length of the sides, and this quadrant is graduated with the degrees, points, and quarter-points. In the vertex of the angle agreeing with the quadrant is pivoted by a pivot $a$ the attached index F. This index F consists of a strip or lath marked to agree with the divisions on the scale. The graduated edge of this index is used as a hypotenuse to any triangle that may be formed, and its sixtieth division forms a tangent to the circle of which the quadrant forms a part on whatever part of the quadrant the index is placed. It will also show the secant to any degree, and thus the meridional parts answering to every degree of the quadrant may be taken separately. The scale and attached index F serve to perform arithmetical computations and to solve all problems in right-angled trigonometry, and in plane, parallel, and Mercator sailing; but the assistance of the detached index H is necessary to solve problems in oblique-angled trigonometry.

The use of the scale and attached index will be described before further reference is made to the assisting detached index.

The use of the scale and index for arithmetical computations is as follows:

RULE FOR MULTIPLICATION.

Suppose 12 to be the multiplier. Set the twelfth smaller graduation on the index to the perpendicular of 10, or the first larger graduation on the side A of the scale. Supposing the numbers 10, 20, 30, &c., shown to represent units, the perpendicular of any multiplicand will then intersect a graduation of the index denoting the sum.

*Example:* $10 \times 12 = 120$, or $5 \times 12 = 60$, &c., and the same for any other multiplier, always bringing the multiplier on the index to the perpendicular of the number 10 or 1 unit on the side A of the scale.

RULE FOR DIVISION.

Suppose 12 to be the divisor. Adjust the index the same as before, and in contact with the dividend on the index will be found the perpendicular of the quotient on the side A.

*Example:* $90 \div 12 = 7\frac{5}{10}$, or $72 \div 12 = 6$, &c., the perpendicular in contact with any dividend on the index thus showing the quotient on the side A of the scale.

FOR THE RULE OF PROPORTION.

*Example:* As 50 is to 60, so is 40 to a desired fourth term. Set 60 on the index to the perpendicular of 50 on the side A of the scale, and then 40 on the index will give 48 on the scale. The fourth term or answer therefore is 48.

In right-angled trigonometry all problems are solved by the triangle formed by taking one leg on the side A, and from the line of the given quantity trace the other leg downward to the line of its given quantity on B, to which set the index, which will show the quantity of the hypotenuse or longest side. This is applicable to all cases.

CASE 1.

The side A equals eighty, the side B equals sixty. Required: the hypotenuse? On the side A (counting from the pivot) take 80. Trace that graduation downward till you come to the graduation marked 60 on the side B. To that intersection set the index, and the number thereon will show the hypotenuse to be 100.

CASE 2.

The side A equals eighty, the hypotenuse one hundred. Required: the leg on the side B? As before, take 80 on the side A; bring 100 on the index to meet the graduation 80, traced downward. Then the intersection will indicate 60 on the side B.

CASE 3.

The hypotenuse equals one hundred. The side A equals sixty. Required: the side B? Take 60 on the side A, bring 100 on index to meet that graduation continued downward and it will give the required side 80 on B, or take the given side on B and 100 brought to it will give the required side 80 on A.

*N. B.*—If the angle at *a* or the pivot were required in Cases 1 and 2, it would appear on the quadrant at the edge of the index to be thirty-seven degrees, but in Case 3 it would be fifty-seven degrees.

In plane sailing the top or side A of the scale seems the most convenient to be used as a meridian, and will be so considered in the following operations, the difference of latitude either north or south to be counted from the pivot *a*, the distance being always taken or found on the index.

CASE 1.

Course and distance given, to find the difference of latitude and departure.

*Example:* A ship sails south twenty-five degrees, easterly ninety-six miles. Required: her difference of latitude and departure?

*Rule:* Set the index to the course twenty-five degrees on the quadrant. From the distance, 96, trace the graduation nearest to that number on the index to the side A, and thence to the pivot. You will then have 87 for the difference of latitude; also, on the same between the side A and the edge of the index you will have 40½ for the departure.

CASE 2.

Course and difference of latitude given, to find the distance and departure.

*Example:* A ship sails southwest by south till her difference of latitude is fifty-eight miles. Required: her departure and distance?

*Rule:* Set the index to the course three points from the meridian, or A. Take the difference of latitude 58. Trace the perpendicular downward to the edge of the index, which will be 70 for the distance. The graduation 58 from the index to the meridian will then quote thirty-eight miles and tenths for the departure.

*Another example:* A ship sails north thirty-eight degrees, westerly till she differ her latitude sixty miles. Required: her distance and departure?

*Rule:* Set the index to the course thirty-eight degrees. Take 60 on the side A. Trace its perpendicular down to the edge of the index and it will be the departure, 47. It will also meet the distance on the index—viz., 76.

CASE 3.

Course and departure given, to find distance and difference of latitude.

*Example:* A ship sails south five points, east till her departure is fifty-four miles. Required: the distance and difference of latitude?

*Rule:* Set the index to five points from the meridian, or A. On the side B take 54, the departure, and trace it toward the left till it meets the edge of the index, where you will find 65 for the distance. Trace the division or perpendicular from that to the meridian and it will give difference of latitude 36.

CASE 4.

Distance and difference of latitude given, to find course and departure.

*Example:* A ship sails between north and east fifty-five miles and finds she has differed her latitude thirty miles. Required: the course and departure?

*Rule:* To the perpendicular of 30 on the meridian A bring 55 on the index from the angle of meeting to the side. A will then be the departure, 46 miles, and the index kept there will show the course on the quadrant 57° easterly.

CASE 5.

Difference of latitude and departure given, to find course and distance.

*Example:* A ship sails between north and west till her difference of latitude is forty miles and her departure fifty-five miles. Required: her course and distance?

*Rule:* From *a* on A take the difference of latitude, forty miles; trace its perpendicular down to fifty-five miles, the departure; set the index to the angle of meeting thereon; you will then have sixty-eight for the distance;

it will also touch the fifty-fourth degree on the quadrant for the course.

Case 6.

Distance and departure given, to find the course and difference of latitude.

*Example:* A ship sails between the north and east fifty-four miles; her departure is thirty miles. Required: her course and difference of latitude?

*Rule:* Take the distance 54 on the index; set it to the departure, 30, traced from the side B to the edge of the index; the perpendicular, traced from the angle of meeting, will show the difference of latitude on the meridian or side A to be 45, nearly; the index so set will show the course on the quadrant to be three points.

Thus I have gone over all the variety considered useful or necessary in plane sailing, and traverse sailing being a compound of the foregoing may be omitted.

In parallel sailing proceed as follows:

Case 1.

Two places in one parallel; their latitude and distance given, to find their difference of longitude.

*Example:* Two places in latitude 50°; distant seventy-six miles. Required: their difference of longitude?

*Rule:* Set the index to the given latitude, 50°, on the quadrant; take the easting or westing, 76, on the side A; trace its perpendicular down to the edge of the index, and the division or number cut by it will be the difference of longitude required, 118—that is, by middle latitude.

Case 2.

Two places in one parallel; their latitude and difference of longitude given, to find their distance.

*Example:* Two places in latitude 50°; their difference of longitude 118. Required: their distance?

*Rule:* Set the index to the given latitude, 50°, on the quadrant, and from 118 on it trace the perpendicular to the side A, where you will find 76 for the distance required.

Case 3.

Two places in one latitude; their distance and difference of longitude given, to find the latitude they are in.

*Example:* A ship sails due west two thousand seven hundred miles, and then finds her difference of longitude to be four thousand two hundred minutes. Required: the latitude the ship sails in?

In the above example the given numbers are too large for the limits of the scale; but there being an equal number of ciphers in both I take 42 and 27 and work with them.

*Rule:* Take 42 on the index and bring it to the twenty-seventh perpendicular on the A. The index will then fall on the fiftieth degree on the quadrant, which is the latitude required.

Case 4.

Two ships sailing both directly north or south; their distance in one parallel given, to find their distance in another parallel.

*Example:* Suppose two ships in latitude 50° north, distant two hundred miles, sail both directly north into latitude 73°. Required: their distance in that parallel?

*Rule:* Set the index to the latitude first given, 50; for the distance, 200, take 20 on side of A, (assuming 10 to 1;) observe what number on the index will come in contact with the perpendicular of 20; here it will be 31; move the index up to latitude 73; when there, observe what perpendicular will be again in contact with 31 on the index; here it will be the ninth, (counting ten to one again;) you then have 90 or 91 = the distance of the two ships in that parallel.

Case 5.

Two ships in one parallel with their distance in that parallel given; sailing both directly north or south, with their distance in the parallel sailed given, to find the latitude come to.

*Example:* Two ships in latitude 50, distant two hundred miles, sail both directly north till their distance is but ninety-one miles. Required: the latitude arrived at?

*Rule:* Set the index as before, and move the number 31 on the index to the perpendicular 90; the index will then cut latitude 73 on the quadrant.

Middle latitude sailing is performed by bringing the distance in easting or westing, commonly called "departure," to the side A, which is assumed as the equator, then setting the index to middle latitude; the perpendicular from the end of the distance or departure traced down will then meet the difference of longitude on the index. The index should be set rather higher than middle latitude to give the true difference of longitude.

Case 1.

Both latitudes and distance given, to find the course, departure, and difference of longitude.

*Example:* A ship in latitude 55° sails between north and east eighty-six miles, and has then come into latitude 56° 10′ north. Required: her course, departure, and difference of longitude?

*Rule:* Take the difference of latitude 70 on the side A; the distance 86 on the index brought in contact with the perpendicular of 70 will show the departure 50 on the side B, and the index without moving will show the course 35° 32′ on the quadrant. Then set the index 55° 35′, take the departure 50 on the side A, assumed as the equator, trace its perpendicular down to the index, upon which you will find 88, = the difference of longitude required.

CASE 2.

Both latitudes and difference of longitude given, to find the course, distance, and departure.

*Example:* Required: the course, distance, and departure between two places, one in latitude 56° 15' north and the other in latitude 58° 35' north, and their difference of longitude being 2° 30'?

*Rule:* Set the index to middle 57° 25' and the difference of longitude being 150', (assuming 3 to 1,) take its third 50 on the index, observe what perpendicular comes in contact with it; in this case it is $27 \times 3 = 81$ for the departure. Then the difference of latitude being 140, take its half 70 on the side A, and the departure being 81, take its half $40\frac{1}{2}$ on the side B, set the index thereto, and the distance thereon doubled will be the required distance, 162. The index will also show the course on the quadrant, nearly 30°.

Mercator sailing is performed by taking the proper difference of latitude, as also the meridian difference of latitude on the side A. From the end of the meridian difference of latitude take the difference of longitude on the side B, to which set the index, and you will have the enlarged distance. Then without moving the index you will find the course by its edge on the quadrant. From the proper difference of latitude to the edge of the index will give the departure, and from its meeting with the index to the pivot will give the distance.

CASE 1.

Both latitudes and departure given, to find the course, distance, and difference of longitude.

*Example:* A ship departs from latitude 55° north and sails between the north and east into latitude 56° 10' north, her departure being fifty miles. Required: the course steered, the distance sailed, and the difference of longitude?

*Rule:* The difference of latitude being 1° 10'—viz., seventy miles—trace the seventieth division down to 50, the departure to the angle of meeting; set the index thereto, and it will show the distance thereon equals eighty-six miles sailed, steering in course 35° 32'. Then set the index to 56°, and the tangent or sixtieth division will quote 106 for the meridian part to that degree the least moved up, and 10' will give 18 for meridian parts, added to 106, will equal 124; but as this runs beyond the end of the scale, take its half, sixty-two, and half, seventy, equal thirty-five, and half, fifty, equal twenty-five. Then from 70 to the edge of the index will be 89, = the difference of longitude required.

The detached index H in Fig. 2 and its use in connection with the scale and attached index in solving problems in oblique-angled trigonometry will now be described. The detached index consists of a thin lath or strip having one edge graduated on both sides in the same manner as the sides of the scale and the edge of the attached index. At the end where the graduations commence is a circular piece whose center is the zero-point or termination of the graduated edge. The circumference of the circular piece is graduated on one side in points and quarter-points of the compass and on the other side in degrees. An opening is made in the circle, as shown at P in Figs. 2 and 3, so as to leave the graduated straight edge perfect and clear and a point to indicate the center of the circle. Its use is as follows, and as illustrated by the diagrams, Figs. 4, 5, 6, 7, and 8 of the drawings:

CASE 1.

Given three sides, to find the angle.

*Example:* Referring to Fig. 4. Given side L M equals seventy, side M N equals fifty-seven, and side N L equals sixty-four. Required: the angles?

*Rule:* Set the center of the assisting detached index to 70 on the side A, (for a base,) with its projecting leg over the scale. Then take 57, the side M N on it, and take 64, the side N L on the index of the scale, bring those numbers on each, respectively, in contact with each other. The angle L will be found indicated by the attached index on the quadrant as $4\frac{1}{2}$ points. Then for angle N hold the fixed index fast, set the center of the detached index to 64 on the index of the scale, bring its working-side to 70 on the side A, and the circle will then show the angle N contained between the two indexes to be $6\frac{1}{4}$ points.

CASE 2.

Two angles and a contained side given, to find the sides and angles.

*Example:* Referring to Fig. 5. Given the side L M equals sixty; the angle L equals three points; the angle M equals five points. Required: the side L N and side M N and the angle N?

*Rule:* Set the attached index to three points from the side A on quadrant of scale and keep it there; also set the center of the assisting index to 60 on the side A; bring it to make an angle of five points with the side A. The intersection of the indexes will then indicate the side L N to be 50 and the side M N to be 33.5. To obtain the angle N, hold the index of scale fast on three points; set the center of the assisting index to 50 on it; bring its working-side to 60 on side A of scale. The angle N contained between both indexes will be eight points.

CASE 3.

Two sides and an angle opposite one of them given, to find the other angles and third side.

*Example:* Referring to Fig. 6. Given the side M N equals seventy-seven, the side L M equals ninety, and the angle L equals five points. Required: the angles M and N and the side L N?

*Rule:* Set the center of the assisting detached index on the attached index at 90; make therewith the given angle five points. Preserving the angle, move the attached index to or from until its working side comes in contact with 77, the given side, on the side A on the scale. The assisting detached index will then show the quantity of the side sought to be 65. On the quadrant of scale at the edge of the attached index the angle M will be found to equal four points. To obtain the angle N reverse the assisting detached index, place its center to 77 on the side A, bring 65 (the side found on it) in contact with 90 on attached index, and the circle of the assisting index will then show on the side A that the angle N is equal to 7 points.

*Example 2:* Referring to Fig. 7. Given the side L M equals fifty, the side M N equals sixty, and the angle L equals four and one-half points. Required: the angles M and N and the side L $N^2$.

*Rule:* Make the angle L four and one-half points with the attached index on the quadrant of scale and keep the index there. To 50 on the attached index set the center of the assisting detached index, bring 60 on the said assisting index to the side A, and the assisting index will then cut at 78½, which is the side sought. It will also show the quantity of angle M = eight points on its circle. Reverse the assisting index, place its center at 78½ on the side A, bring its working edge to 50 on the attached index, and it will then show the angle N to equal three and one-half points.

CASE 4.

Two sides and the contained angle given, to find the other angles and third side.

*Example:* Referring to Fig. 8. Given side L M equals seventy-six, side L N equals forty, and the contained angle equals three points. Required: the angles M and N and the side M $N^2$.

*Rule:* Set the attached index to 3 points from side A on quadrant of scale, the given angle, and hold it there. Set the center of assisting index to 40 (one of the given sides) on the attached index, bring the working edge of it to 76 on the side A, and the angle N included within both indexes will then be 10½ points. The assisting detached index will show the third side to be 48. Reverse the assisting index, place its center to 76 on the side A, bring its working edge to 40 on index of scale held on the given angle, and the angle M will then be given 2½ points on the circle of detached index.

Having thus described my invention, I claim as new and desire to secure by Letters Patent as an improved article of manufacture—

A mathematical mechanical scale composed of the graduated plane square A B C D E, divided and subdivided into less squares of tenths each way and having a graduated quadrant E in one of the four corners, the radius of which quadrant extends to 60 of the subdivisions, or sixteenths of the sides of the squares, and also provided with an index F, marked as described and pivoted to the square in the vertex of the angle agreeing with the quadrant, and otherwise made as herein shown and described.

ALEXANDER M. CHISHOLM.

Witnesses:
HUGH M. DONALD,
W. A. HENRY.